United States Patent [19]

LaRoche

[11] Patent Number: 5,107,797
[45] Date of Patent: Apr. 28, 1992

[54] LITTERBOX FOR DOMESTIC ANIMALS

[76] Inventor: Jean-Luc LaRoche, 6, Rue Pre Saint Arnould, 88100 Saint Die, France

[21] Appl. No.: 694,879

[22] Filed: May 2, 1991

Related U.S. Application Data

[63] Continuation-in-part of Ser. No. 228,006, Aug. 3, 1988, abandoned.

[51] Int. Cl.⁵ .......................... A01K 1/01; A01K 29/00
[52] U.S. Cl. ...................................... 119/166; 119/163; 209/296
[58] Field of Search ................... 119/163, 164, 166; 209/283, 294, 296

[56] References Cited

U.S. PATENT DOCUMENTS

| | | | |
|---|---|---|---|
| 4,120,264 | 10/1978 | Carter | 119/166 |
| 4,190,525 | 2/1980 | Menzel | 119/166 |
| 4,574,735 | 3/1986 | Hohenstein | 119/163 |
| 4,846,104 | 7/1989 | Pierson | 119/166 |

Primary Examiner—John G. Weiss
Attorney, Agent, or Firm—Weiser & Stapler

[57] ABSTRACT

A litterbox includes a rotatable enclosure having at least one access opening for a domestic animal and a rake disposed on its inner surface, a motor for selectably rotating the enclosure, and a receptacle disposed within the enclosure and movable between a first position generally against the inner surface of the enclosure, and a second position which is nearly vertically disposed within the enclosure. In operation, the receptacle is extended to an operative position, and the enclosure is rotated so that the rake will separate relatively large particles of solid excrement from the litter for deposit into the receptacle. The receptacle is then retracted to its initial, rest position. The litterbox may further operate to detect the presence of a domestic animal within the enclosure, and to initiate rotation of the enclosure when the domestic animal leaves the enclosure, to provide for fully automated operation of the litterbox.

19 Claims, 7 Drawing Sheets

LITTERBOX FOR DOMESTIC ANIMALS

RELATED CASE

This application is a continuation-in-part of U.S. Pat. application Ser. No. 07/228,006, filed Aug. 3, 1988 now abandoned.

FIELD OF THE INVENTION

This invention relates to a litterbox for domestic animals, especially for cats, having means for automatically separating solid excrement from the litter.

BACKGROUND OF THE INVENTION

For the natural needs of domestic animals such as cats, it is customary to use litterboxes or containers for receiving solid and liquid excrement in a quantity of litter. To prevent odors and ensure cleanliness, the litter must be cleaned regularly and changed at regular intervals. Maintenance of the litter requires more or less daily attention by the pet owner. This continual maintenance is not only unpleasant, but inconvenient if the pet owner wishes to leave the house for an extended period of time.

A device for automatically separating solid excrement from used litter is shown, for example, in French Patent 2,556,621. This device generally comprises a hopper for dispensing litter onto a movable film, and a filter for covering used litter removed by the movable film. The solid excrement is separated from the litter by means of a grating, so as to be received in a collection chamber where it is stored, and periodically discharged. However, this device has a number of disadvantages. The device requires both a supply of litter and a supply of film, both of which must be maintained continuously. The device employs heavy and expensive mechanisms which are susceptible to malfunction, and there are difficulties in sealing off the litter granules from the drive mechanism. Furthermore, the litter is periodically discharged according to a time period which is determined by the user, leading to the disadvantage that the litter will be changed (completely) with each cycle of operation, whether the litter is soiled or not.

SUMMARY OF THE INVENTION

It is therefore the primary object of the present invention to provide a litterbox having improved means for automatically separating solid excrement from the litter.

It is another object of the invention to provide an automatic litterbox wherein the litter need not be replaced with each cycle of operation.

It is another object of the invention to provide an automatic litterbox wherein the separated solid excrement is collected in an enclosed receptacle.

It is another object of the invention to provide an automatic litterbox wherein the operating mechanism is substantially separated from the litter granules.

It is another object of the invention to provide an automatic litterbox which is neat and compact in overall external appearance.

These and other objects are achieved in accordance with the present invention by providing a litterbox for a domestic animal comprising a rotatable enclosure having at least one access opening, and including a rake disposed on its inner surface; a motor for selectably rotating the enclosure; and a receptacle disposed within the enclosure and movable between a first position generally against the inner surface of the enclosure, and a second position which is nearly vertically disposed within the enclosure. In operation, the receptacle is extended to its second, operative position, and the enclosure is rotated so that the rake will separate relatively large particles of solid excrement from the litter, for deposit into the receptacle. The receptacle is then retracted to its first, rest position. If desired, the litterbox may further include means for detecting the presence of a domestic animal within the enclosure, and means for initiating rotation of the enclosure when the domestic animal leaves the enclosure, to provide for fully automated operation of the litterbox.

For further detail regarding preferred embodiments of the litterbox of the present invention, reference is made to the detailed description which is provided below, taken in conjunction with the following illustrations.

BRIEF DESCRIPTION OF THE DRAWINGS

In the several views provided, like reference numbers denote similar structures.

DETAILED DESCRIPTION OF THE INVENTION

Figure 1:
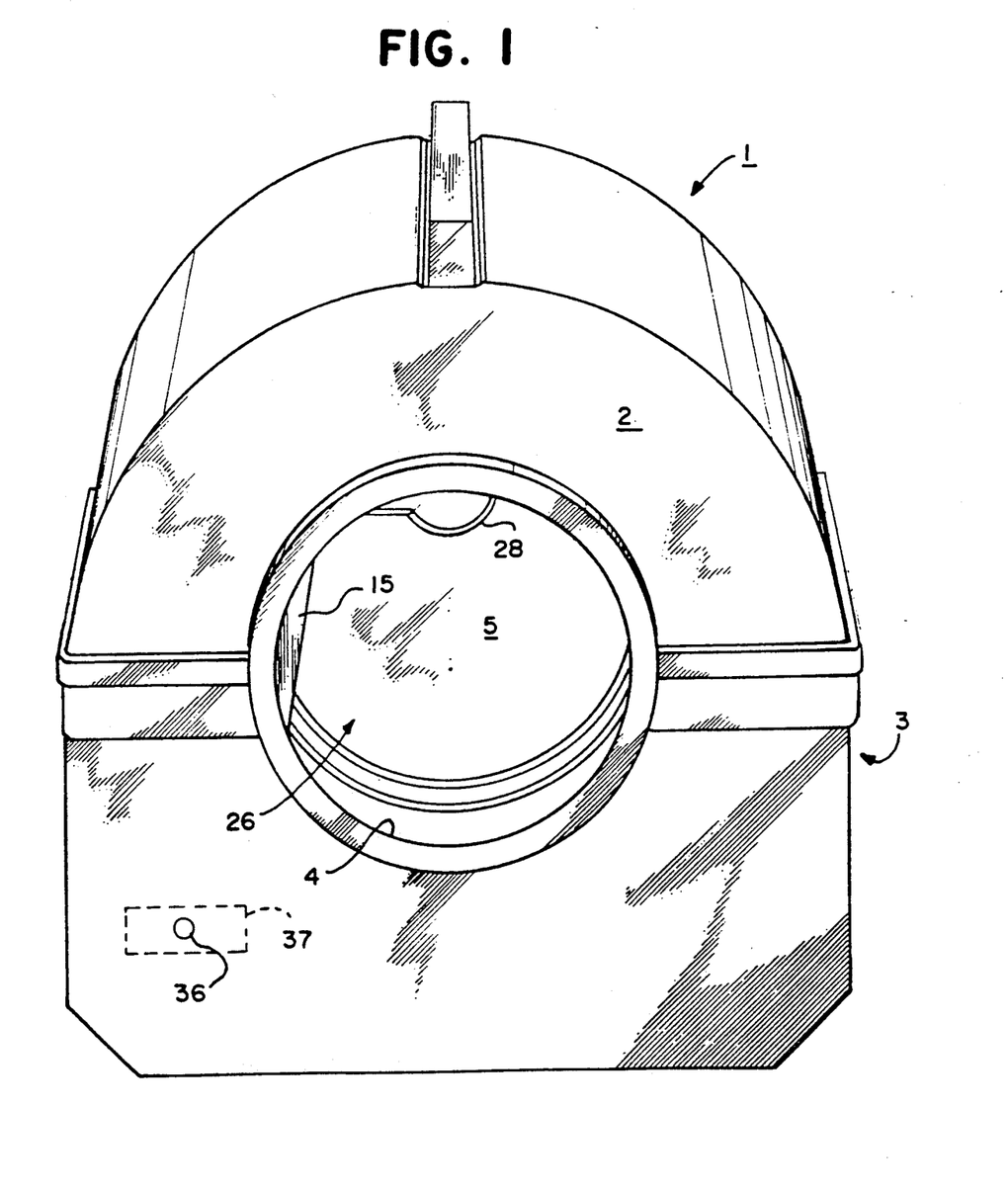
FIG. 1 is a perspective view showing external features of the litterbox of the present invention.

As illustrated in FIG. 1, the apparatus 1 of the present invention is generally enclosed by a housing 2, which may be made of any of a variety of common materials such as plastics or aluminum. The housing 2 is useful in containing odors, and may include a carrying handle for ease in transporting the apparatus 1. One end 3 of the housing 2 incorporates an entrance opening 4, which is sized for a domestic animal (such as a cat) to easily enter and exit the apparatus 1.

The entrance opening 4 communicates with a rotatable cylindrical enclosure 5, which will be described in detail below. The defined enclosure is of a general size sufficient to accommodate the domestic animal. The rotatable enclosure 5 is filled to an appropriate depth with litter material, which can rest either upon the inner surface of the enclosure 5, or upon a removable drawer 60 (see FIG. 10) which itself rests upon the inner surface of the enclosure 5, in either case serving the function of an ordinary litterbox. To be noted is that the enclosure 5 and the drawer 60, if used, are removable from the apparatus 1 to facilitate their cleaning.

Figure 2:
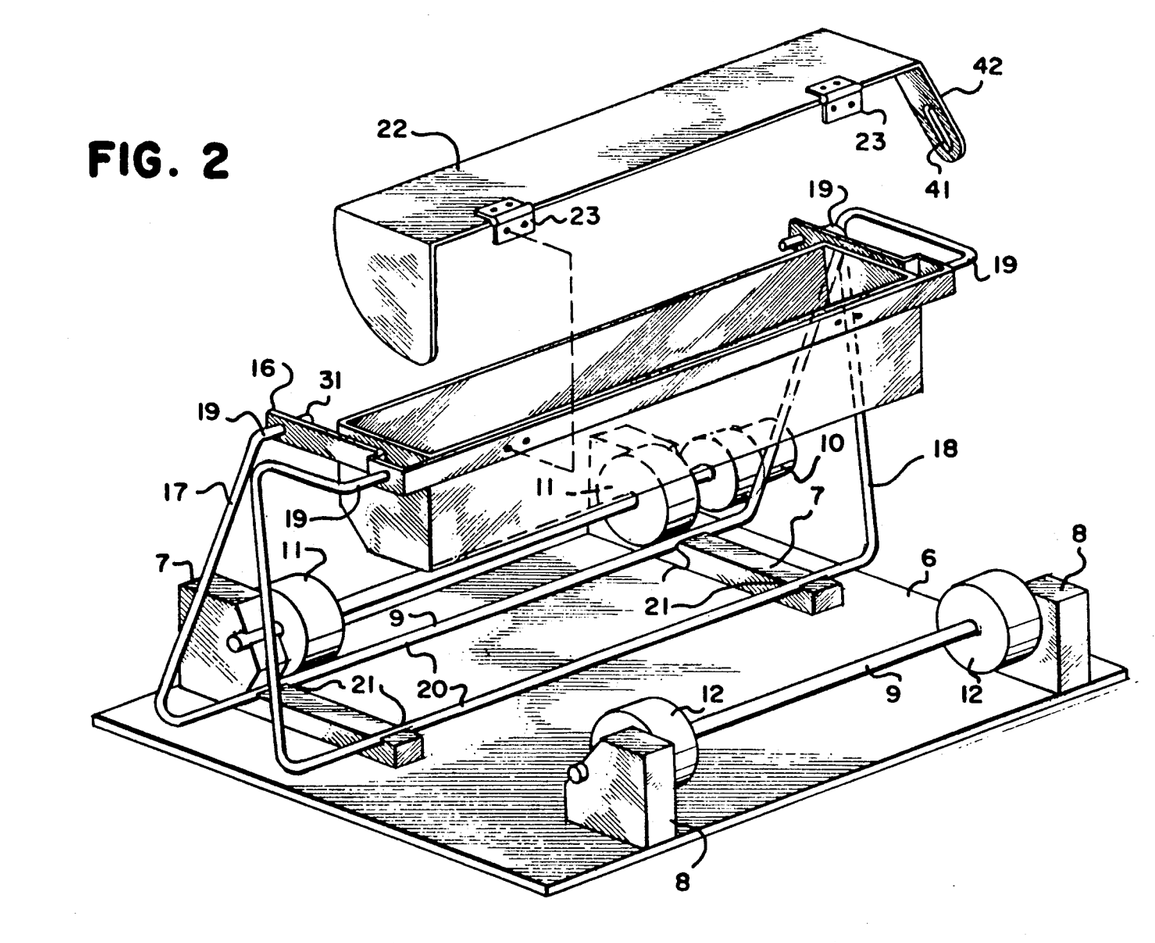
FIG. 2 is an exploded, isometric view showing the internal mechanism of the litterbox.
Figure 3:
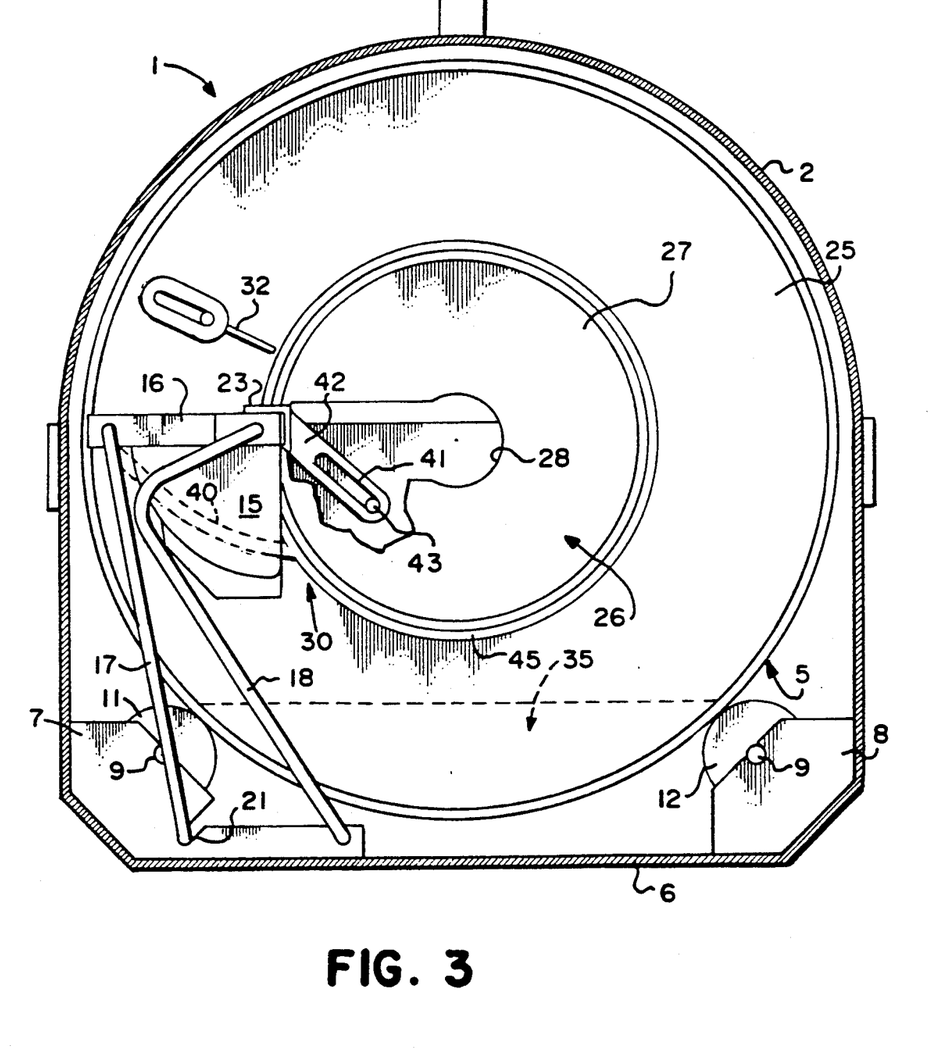
FIGS. 3 to 5 are schematic sectional views of the litterbox, showing a typical operating cycle.
Figure 4:
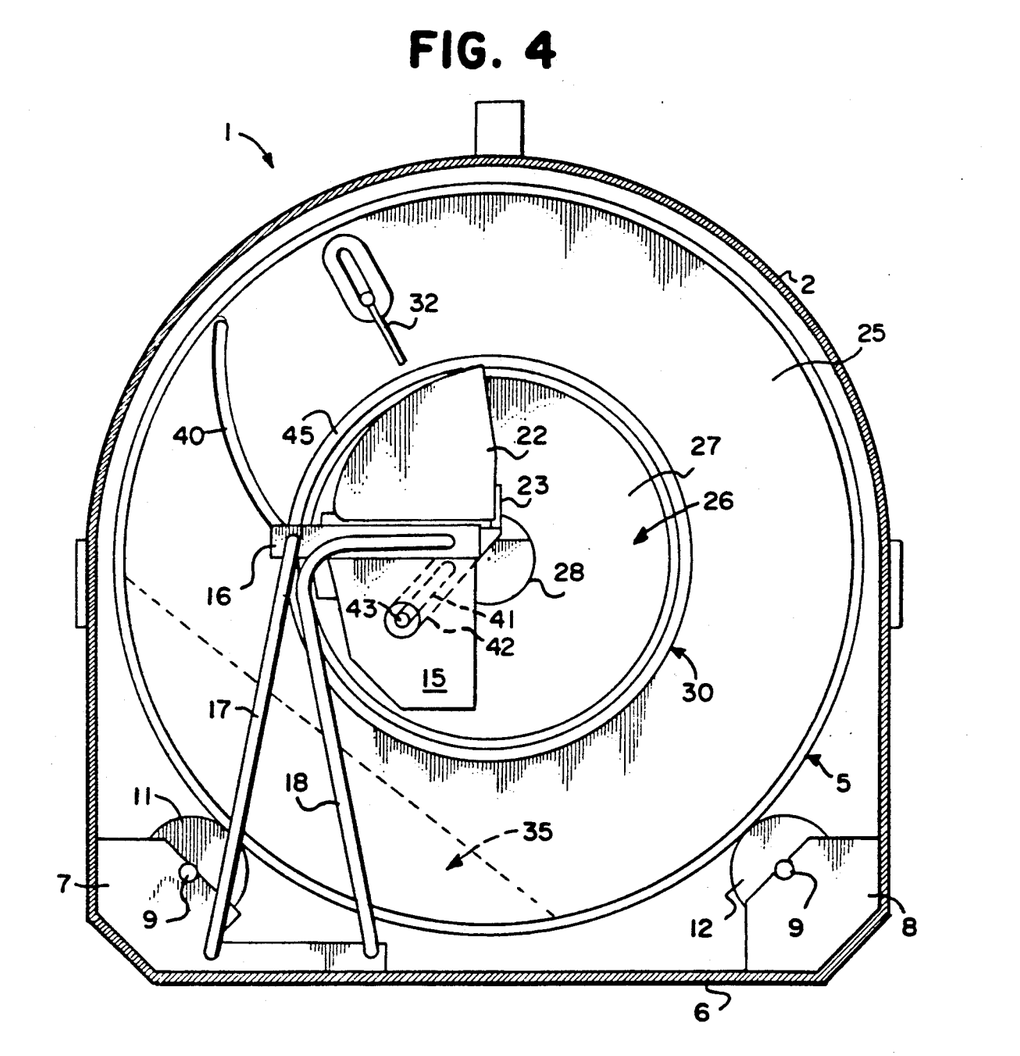
Figure 5:
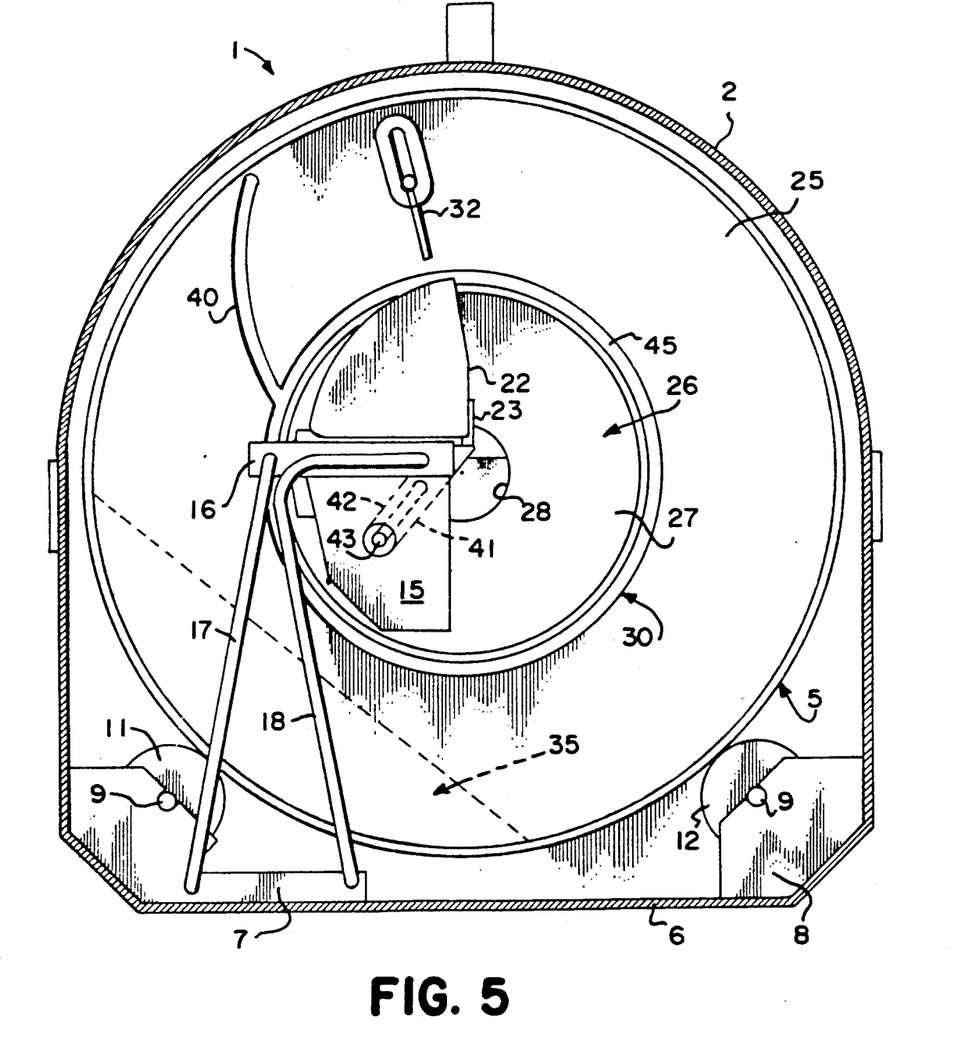

Referring now to FIG. 2, the base 6 of the housing 2 includes a plurality of roller supports 7, 8. A pair of axles 9 are received by the roller supports 7, 8, which in turn receive a plurality of rollers 11, 12. A motor 10 is provided for selectively rotating at least two of the rollers 11, to cause desired rotations of the enclosure 5 (which is supported on the rollers 11, 12 as is best illustrated in FIGS. 3 to 5 of the drawings). The remaining pair of rollers 12 may be passive, or driven, as desired.

Also shown in FIG. 2 is a retractable receptacle 15, for receiving waste material as will be described more fully below. The receptacle 15 is preferably removably mounted to a frame 16 to facilitate the discard of collected waste material. If desired, the receptacle 15 may include a plastic lining (not shown) for ease in cleaning. Alternatively, the receptacle 15 may be disposable.

To accomplish desired movements of the receptacle 15, a pair of supports 17, 18 interconnect the frame 16 which receives the receptacle 15 with the roller supports 7. To this end, the ends 19 of the supports 17, 18 are journalled for rotation within the frame 16, and the bases 20 of the supports 17, 18 are journalled for rotation within a pair of notches 21 formed in the roller supports 7. As a consequence, controlled lateral movements of the frame 16, and the receptacle 15 which it supports, are made possible. The frame 16 additionally receives a cover 22 for enclosing the receptacle 15, which is attached to the frame 16 by a pair of hinges 23.

Figure 8:
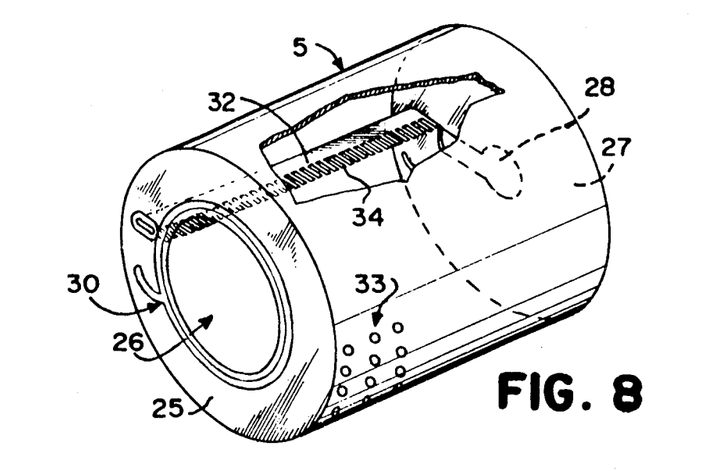
FIG. 8 is an isometric view of the enclosure of the litterbox.

When assembled (see FIGS. 3 to 5), the enclosure 5 is disposed within the housing 2 of the apparatus 1, resting upon the rollers 11, 12, and the receptacle 15 is supported within the enclosure 5 by the supports 17, 18. As is best illustrated in FIG. 8, a first end 25 of the enclosure 5, which corresponds to the end 3 of the housing 2 having the opening 4, incorporates an opening 26 which is shaped to accommodate passage of the domestic animal. The opening 26 further serves to accommodate movements of the frame 16 which retains the receptacle 15 in place. The remaining (second) end 27 of the enclosure 5 may additionally incorporate an opening shaped to accommodate passage of the domestic animal, or may simply incorporate a slotted aperture 28 shaped to accommodate movements of the frame 16 which retains the receptacle 15 in place.

Figure 9:
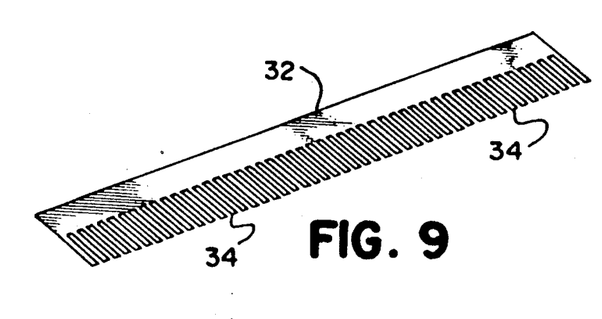
FIG. 9 is an isometric view of the rake of the litterbox.

The enclosure 5 further includes a configured groove 30 defined in one (or possibly both) of its ends, in this case the end 25. The configured groove 30 receives a follower 31, to accomplish desired movements of the receptacle 15 which will be described below. Also mounted on an inner surface of the enclosure 5 is a rake 32 (FIG. 9), which serves to comb through the litter disposed within the enclosure 5. If desired, a plurality of apertures 33 (partially shown in FIG. 8) may be provided in the enclosure 5, for the discharge of urine from the bottom of the enclosure 5.

FIGS. 3 to 5 sequentially illustrate operations of the apparatus 1. As previously mentioned, the rotatable enclosure 5 is mounted within the housing 2, resting upon the rollers 11, 12. In use, the enclosure 5 is filled to an appropriate depth (shown in phantom) with litter material 35. It is common for the manufacturers of such litter material to call for the litter material to be distributed to a depth of between 3 and 7 centimeters, and the diameters of the enclosure 5 and the entrance opening 4 are sized to accommodate this depth while preventing unwanted spillage of litter material from the apparatus.

In a typical cycle of operation, the enclosure 5 is caused to rotate by motor 10, preferably by slightly more than one full rotation. Such rotation causes the rake 32 to progress through a complete rotation, portions of which cause the rake 32 to pass through bottom portions of the enclosure 5. As a result, the rake 32 combs through the litter 35, removing particles of solid waste which have been left by the domestic animal. To this end, the rake 32 includes a plurality of teeth 34 (see FIG. 9) spaced in accordance with the granular size of the litter 35 so that granules of litter 35 will pass between the teeth 34 while solid waste will be entrained by the teeth 34. In this way, the litter 35 is cleaned of solid waste with each operating cycle of the apparatus 1. After the solid waste has been collected by the rake 32, the collected waste material is deposited in the receptacle 15, completing the basic operating cycle. FIGS. 3 to 5 show the foregoing operations in greater detail.

FIG. 3 shows the apparatus 1 in its rest position, with the receptacle 15 in a retracted position, against the side of the enclosure 5. In this position, the domestic animal is free to enter and exit from the enclosure 5, as desired. When cleaning is desired (which can be initiated by a push-button control 36 and timer 37), the enclosure 5 is caused to rotate, in this case in a generally clockwise direction. The configured groove 30 defined in the end wall 25 of the enclosure 5 is shaped so that when the enclosure 5 is rotated in a clockwise direction, the follower 31 is caused to advance along a track 40 defined in the configured groove 30, which causes the receptacle 15 to move from its rest position (as shown in FIG. 3) to an operative position (as shown in FIG. 4) in which the receptacle 15 is located at or near the vertical mid-plane of the enclosure 5. Movement of the receptacle 15 to its operative position also operates to advance the slot 41 of an actuation lever 42 along a fixed pivot 43 (fixed to the enclosure of the apparatus). This in turn operates to pivot, and open the cover 22 of the receptacle 15 (FIG. 4), readying it for the deposit of solid waste as previously described. The slotted aperture 28 formed in the far end 27 of the enclosure 5 is sized and shaped to enable such pivoted movements without interfering with rotations of the enclosure 5. To be noted is that such rotation of the enclosure 5 will also cause the litter 35 to assume an angle (on the order of 45 degrees) relative to the horizontal. However, this will have no adverse affect on the operations which follow.

Upon reaching the end of the track 40 (FIG. 4), follower 31 will then enter a peripheral track 45, which completes the configured groove 30. This operates to maintain the receptacle 15 in its advanced, operative position as rotation of the enclosure 5 continues. In the course of such rotation, the rake 32 is caused to pass through the bottom of the enclosure 5, and the litter material 35, removing solid waste which it contains. Such rotation continues until the position illustrated in FIG. 5 is reached. In this position, and toward the end of the operating cycle, rake 32 is disposed adjacent to the opened cover 22 of the receptacle 15, so that waste material collected by the rake 32 can drop, under the influence of gravity, into the open receptacle 15.

Figure 6:
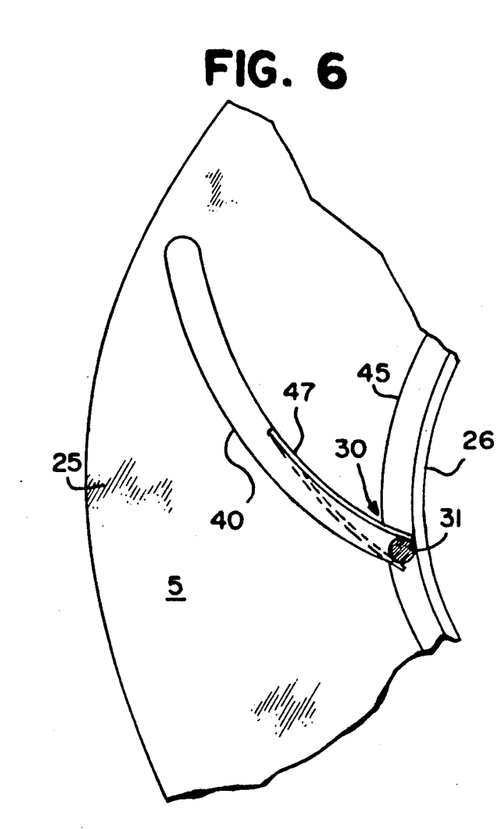
FIG. 6 is an enlarged, partial elevational view of a groove and follower arrangement used in providing this operating cycle.

Such rotation of the enclosure 5 (with the rake 32 now cleared of collected waste material) will cause the follower 31 to advance along the track 45, past the track 40. As best illustrated in FIG. 6, a ratchet 47 is disposed along the innermost edge of the track 40 which is adapted to allow the follower 31 to pass the track 40, to a position just beyond the track 40. As shown in phantom in FIG. 6, the ratchet 47 is formed of a spring-like material which permits passage of the follower 31 in a clockwise direction, but which prevents passage of the follower 31 when the enclosure 5 is rotated in a counterclockwise direction. As a result, counterclockwise rotation of the enclosure 5 will cause the follower 31 to progress along the track 40, returning to the rest position shown in FIG. 3, in addition to repositioning the litter 35 so that it is once again generally horizontally disposed. This in turn causes the receptacle 15 to move from the operative position of FIG. 4 to the rest position of FIG. 3. This also operates to close the cover 22 over the receptacle 15, responsive to the actuation lever 42.

Such counterclockwise movement may be accomplished by weighting the enclosure 5, so that once the follower 31 passes the track 40 and the motor 10 is stopped, the enclosure 5 will fall in the counterclockwise direction which is desired. Such movement may be augmented with mechanical stops (e.g., of the magnetic type), if desired. Alternatively, a spring may be employed to return the enclosure 5 (and the receptacle 15) to its rest position upon discontinued operation of the motor 10. Alternatively, the motor 10 may be controllable, for rotation in either of two directions, so that following a complete rotation of the enclosure 5, the direction of rotation of the motor 10 may be reversed to move the enclosure 5 in a counterclockwise direction for return (with the receptacle 15) to the rest position of FIG. 3. Movements of the receptacle 15 may alternatively be controlled responsive to an eccentric, make use of techniques which are themselves known to one of ordinary skill in the art. Similarly, operation of the cover 22 for the receptacle 15 may be accomplished through any of a number of expedients known in the art.

As previously indicated, the foregoing operations may be initiated manually, responsive to a push-button control 36. If desired, such operations may also be initiated automatically, at appropriate times such as following a departure of the domestic animal from the apparatus 1. Such automatic operation may be accomplished by sensing the presence (e.g., the weight) of the domestic animal in the enclosure 5, and by then initiating the above-described operating cycle when the presence of the domestic animal is no longer detected.

Figures 7, 10:
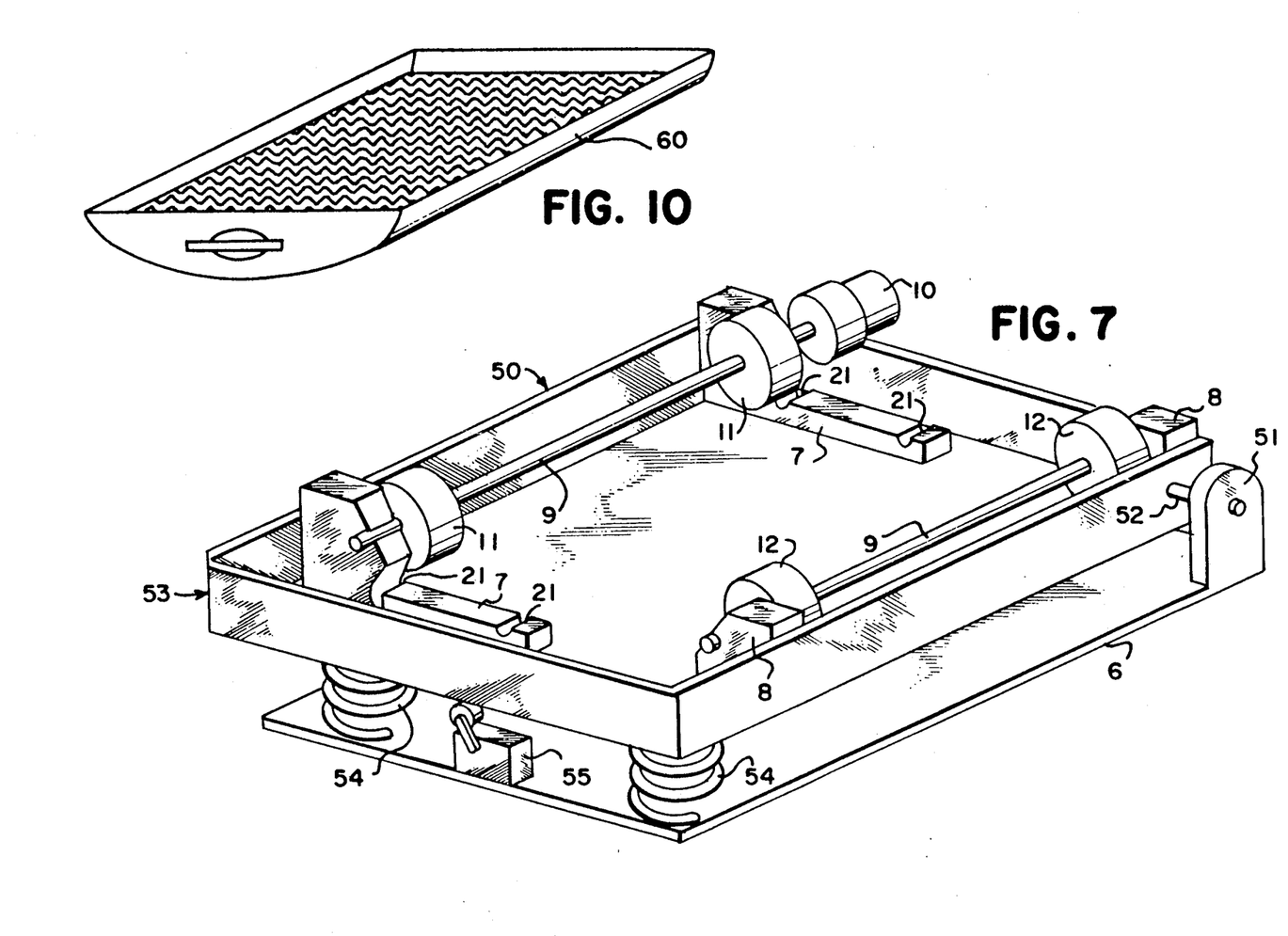
FIG. 7 is an isometric view of means for detecting the presence of a domestic animal in the enclosure of the litterbox.
FIG. 10 is an isometric view of a removable drawer for receiving the litter material.

FIG. 7 illustrates one such means for automatically detecting the departure of the domestic animal, responsive to changes in weight. In this embodiment, the base 6 of the apparatus 1 further includes an intermediate frame 50 for receiving the roller supports 7, 8 (and the rollers 11, 12 and supports 17, 18) previously described. The enclosure 5 is once again rotatably supported by the rollers 11, 12, in this case resting upon the intervening frame 50. The base 6 includes bearing blocks 51 for receiving an axle 52, which in turn extends through the frame 50, and which serves as a fulcrum for the supported frame 50. The opposing end 53 of the frame 50 (preferably the end of the frame 50 which faces the entrance opening 4) is supported by a pair of springs 54. A contact switch 55 is positioned on the base 6, just beneath the end 53 of the frame 50. As a consequence, when a domestic animal enters the enclosure 5, the contact switch 55 will be compressed by the end 53 of the frame 50, which will rotate about the axle 52 responsive to the weight of the domestic animal. To be noted is that this function is accomplished without placing undue physical strain on the contact switch 55. As the domestic animal leaves the enclosure 5, the resulting reduction in weight will cause the frame 50 to lift back to its original position, releasing the contact switch 55. This change in state (departure of the domestic animal) can be used to initiate the previously described operating cycle. Other means may be used to similarly initiate the operating cycle, such as photocells or other detectors placed at the opening 4, or by employing a swing door enclosing the opening 4 to the apparatus 1, if desired.

Of course many variations to the above-described apparatus may be provided without departing from the scope of the present invention. For example, in place of, or in addition to the above-described means for initiating an operating cycle of the apparatus 1, such operations may be initiated at regular (defined) time intervals, or at a prescribed time after the domestic animal has exited from the enclosure 5. The apparatus 1 may be used with any commercially available type of litter, such as absorbent or non-absorbent litter, or litter that congeals into larger clumps when exposed to moisture. To be noted is that in addition to separating solid waste material from the litter 35, the rake 32 also serves to aerate, homogenize, and smooth out the litter, as is typically preferred by litter manufacturers for the proper use of their products.

It will therefore be understood that various changes in the details, materials and arrangements of parts which have been herein described and illustrated in order to explain the nature of this invention may be made by those skilled in the art within the principle and scope of the invention as expressed in the following claims.

What is claimed is:

1. A litterbox for a domestic animal, comprising:
   a rotatable enclosure for receiving a quantity of litter, having at least one access opening and including a rake disposed on an inner surface of the enclosure for combing through the litter when the enclosure is rotated;
   a motor for selectably rotating the enclosure; and
   a receptacle disposed within the enclosure and movable between a retracted position generally against the inner surface of the enclosure and an extended position near a vertical mid-plane of the enclosure, so that material entrained by the rake can drop into the receptacle when in the extended position.

2. The litterbox of claim 1 wherein the enclosure is cylindrical, and an end of the cylindrical enclosure includes the access opening.

3. The litterbox of claim 1 wherein the rake includes a plurality of teeth spaced to entrain congealed material and to pass litter granules.

4. The litterbox of claim 1 wherein the enclosure is cylindrical, and axially rotatable for 360 degrees.

5. The litterbox of claim 4 wherein the enclosure rests upon a plurality of rollers, and wherein at least some of the rollers are operatively coupled with the motor for selectably rotating the enclosure.

6. The litterbox of claim 4 wherein rotation of the enclosure draws the rake through the litter.

7. The litterbox of claim 4 wherein rotation of the enclosure is operatively coupled with movements of the receptacle.

8. The litterbox of claim 1 which further includes push-button control means for initiating rotation of the enclosure.

9. The litterbox of claim 1 which further includes means for detecting the presence of a domestic animal within the enclosure, and means for initiating rotation of the enclosure responsive to changes in state of the detecting means.

10. The litterbox of claim 9 wherein the initiating means operates responsive to a departure of the domestic animal from the enclosure.

11. The litterbox of claim 9 wherein the detecting means includes a contact switch responsive to weight of the domestic animal.

12. The litterbox of claim 9 wherein the detecting means is operatively coupled with a frame for receiving the enclosure and movable responsive to changes in weight of the enclosure and the domestic animal which it contains.

13. The litterbox of claim 1 wherein the receptacle is supported within the enclosure, for movement between the retracted and extended positions, by supports for controlling movements of the receptacle.

14. The litterbox of claim 13 which further includes means for moving the receptacle between the retracted and extended positions responsive to rotation of the enclosure.

15. The litterbox of claim 14 wherein the moving means includes a configured groove formed in the enclosure, and a follower received in the groove and interconnected with the receptacle so that rotation of the enclosure causes displacements of the follower which move the receptacle within the enclosure.

16. The litterbox of claim 15 wherein the configured groove includes a first track for causing extension and retraction of the receptacle, and a second track for maintaining the receptacle in the extended position during rotation of the enclosure.

17. The litterbox of claim 16 which further includes a ratchet extending along and from the first track of the groove, and into the second track of the groove, for causing the receptacle to return to the retracted position following an operating cycle of the litterbox.

18. The litterbox of claim 1 which further includes a cover pivotally mounted to the receptacle, and means for opening and closing the cover responsive to movements of the receptacle.

19. The litterbox of claim 1 wherein the enclosure further includes a plurality of openings for discharging urine.

* * * * *